US008270139B2

(12) United States Patent
Caggiano et al.

(10) Patent No.: US 8,270,139 B2
(45) Date of Patent: Sep. 18, 2012

(54) ADJUSTABLE ARC ELECTRODE ASSEMBLY AND METHOD OF ASSEMBLING

(75) Inventors: Robert Joseph Caggiano, Wolcott, CT (US); Dean Arthur Robarge, Southington, CT (US)

(73) Assignee: General Electric Company, Schenectady, NY (US)

( * ) Notice: Subject to any disclaimer, the term of this patent is extended or adjusted under 35 U.S.C. 154(b) by 142 days.

(21) Appl. No.: 12/883,384

(22) Filed: Sep. 16, 2010

(65) Prior Publication Data

US 2012/0069477 A1 Mar. 22, 2012

(51) Int. Cl.

| | |
|---|---|
| ***H02H 1/00*** | (2006.01) |
| ***H02H 1/04*** | (2006.01) |
| ***H02H 3/22*** | (2006.01) |
| ***H02H 9/06*** | (2006.01) |
| *H02H 3/00* | (2006.01) |
| *H02H 7/00* | (2006.01) |

(52) U.S. Cl. ........................................... 361/120; 361/2

(58) Field of Classification Search .................. 361/120
See application file for complete search history.

(56) References Cited

U.S. PATENT DOCUMENTS

| | | | | |
|---|---|---|---|---|
| 4,904,838 | A | 2/1990 | Szantho et al. | |
| 7,929,260 | B2 * | 4/2011 | Roscoe et al. .................... | 361/2 |
| 2009/0010299 | A1 | 1/2009 | Kummer et al. | |

FOREIGN PATENT DOCUMENTS

| | | | |
|---|---|---|---|
| EP | 525404 | B1 | 8/1994 |
| GB | 195453 | A | 3/1923 |
| JP | 2298791 | A | 12/1990 |

* cited by examiner

*Primary Examiner* — Dharti Patel
(74) *Attorney, Agent, or Firm* — Global Patent Operation

(57) ABSTRACT

A circuit protection device for use with a circuit that includes at least one conductor includes at least one phase electrode assembly that is electrically coupled to the at least one conductor, wherein the at least one phase electrode assembly comprising an adjustable electrode assembly. The circuit protection device also includes a conductor base comprising at least one isolation area sized to secure the adjustable electrode assembly therein, and a conductor cover coupled to the conductor base and including at least one isolation channel, wherein the adjustable electrode assembly extends at least partially through the at least one isolation channel.

18 Claims, 6 Drawing Sheets

ADJUSTABLE ARC ELECTRODE ASSEMBLY AND METHOD OF ASSEMBLING

BACKGROUND OF THE INVENTION

The embodiments described herein relate generally to power equipment protection devices and, more particularly, to apparatus that include adjustable electrode assemblies.

Known electric power circuits and switchgear generally have conductors that are separated by insulation, such as air, or gas or solid dielectrics. However, if the conductors are positioned too closely together, or if a voltage between the conductors exceeds the insulative properties of the insulation between the conductors, an arc can occur. The insulation between the conductors can become ionized, which makes the insulation conductive and enables formation of an arc flash.

An arc flash is caused by a rapid release of energy due to a fault between two phase conductors, between a phase conductor and a neutral conductor, or between a phase conductor and a ground point. Arc flash temperatures can reach or exceed 20,000° C., which can vaporize the conductors and adjacent equipment. Moreover, an arc flash can release significant energy in the form of heat, intense light, pressure waves, and/or sound waves, sufficient to damage the conductors and adjacent equipment. However, the current level of a fault that generates an arc flash is generally less than the current level of a short circuit, such that a circuit breaker may not trip or exhibits a delayed trip unless the circuit breaker is specifically designed to handle an arc fault condition. Although agencies and standards exist to regulate arc flash issues by mandating the use of personal protective clothing and equipment, there is no device established by regulation that eliminates arc flash.

Standard circuit protection devices, such as fuses and circuit breakers, generally do not react quickly enough to mitigate an arc flash. One known circuit protection device that exhibits a sufficiently rapid response is an electrical "crowbar," which utilizes a mechanical and/or electro-mechanical process by intentionally creating an electrical "short circuit" to divert the electrical energy away from the arc flash point. Such an intentional short circuit fault is then cleared by tripping a fuse or a circuit breaker. However, the intentional short circuit fault created using a crowbar may allow significant levels of current to flow through adjacent electrical equipment, thereby still enabling damage to the equipment.

Another known circuit protection device that exhibits a sufficiently rapid response is an arc containment device, which creates a contained arc to divert the electrical energy away from the arc flash point. At least some known arc containment devices include a plurality of electrodes that are each threaded directly into a corresponding electrode holder. These electrodes cause electrical energy to concentrate at the interface point with the electrode holder, i.e., at the thread, which creates a structurally weak point that can cause failure during use. Moreover, this concentration of energy at the interface point can cause the electrode to become welded or melted to the electrode holder, which requires replacement of both the electrode and the electrode holder after use. Furthermore, because of tolerances in the manufacture of such threaded electrodes, it can be difficult to position these electrodes to obtain consistent results.

BRIEF DESCRIPTION OF THE INVENTION

In one aspect, a circuit protection device is provided for use with a circuit that includes at least one conductor. The circuit protection device includes at least one phase electrode assembly that is electrically coupled to the at least one conductor, wherein the at least one phase electrode assembly includes an adjustable electrode assembly. The circuit protection device also includes a conductor base comprising at least one isolation area sized to secure the adjustable electrode assembly therein, and a conductor cover coupled to the conductor base and including at least one isolation channel, wherein the adjustable electrode assembly extends at least partially through the at least one isolation channel.

In another aspect, an electrical isolation structure is provided for use with a circuit protection device that includes a plurality of phase electrode assemblies each having an electrode movably coupled to an electrode holder, and a phase strap. The electrical isolation structure includes a conductor base including a plurality of isolation areas each sized to secure a respective phase strap therein, wherein the conductor base is configured to provide electrical isolation between the phase straps of the plurality of phase electrode assemblies. The electrical isolation structure also includes a conductor cover coupled to the conductor base and including a plurality of isolation channels, wherein a respective electrode holder extends at least partially through a respective isolation channel of the plurality of isolation channels to provide electrical isolation between a plurality of the electrode holders of the plurality of phase electrode assemblies.

In another aspect, a method is provided for assembling a circuit protection device for use with a circuit that includes at least one conductor. The circuit protection device includes a conductor base having at least one isolation area, a conductor cover having at least one isolation channel, and at least one electrode post assembly having an electrode holder and an electrode that is secured within an opening defined in the electrode holder. The method includes inserting the electrode into the opening, securing the electrode within the opening, securing the at least one electrode post assembly within the at least one isolation area, coupling the conductor cover to the conductor base such that the at least one electrode post assembly extends at least partially through the at least one isolation channel, and electrically coupling the at least one electrode post assembly to the at least one conductor.

DETAILED DESCRIPTION OF THE INVENTION

Exemplary embodiments of apparatus and methods of assembly for use with a circuit protection device are described hereinabove. These embodiments facilitate adjusting a distance between electrodes in a circuit protection device, such as an arc containment device. Adjusting the distance, or air gap, between the electrodes enables an operator to setup the circuit protection device in a manner that best suits the environment in which the circuit protection device is to be used. For example, the distance between the electrodes may be set based on the system voltage. Moreover, the embodiments described herein enable replacement of the electrodes after use, which are among the lowest-cost elements of the circuit protection system.

Figure 1:
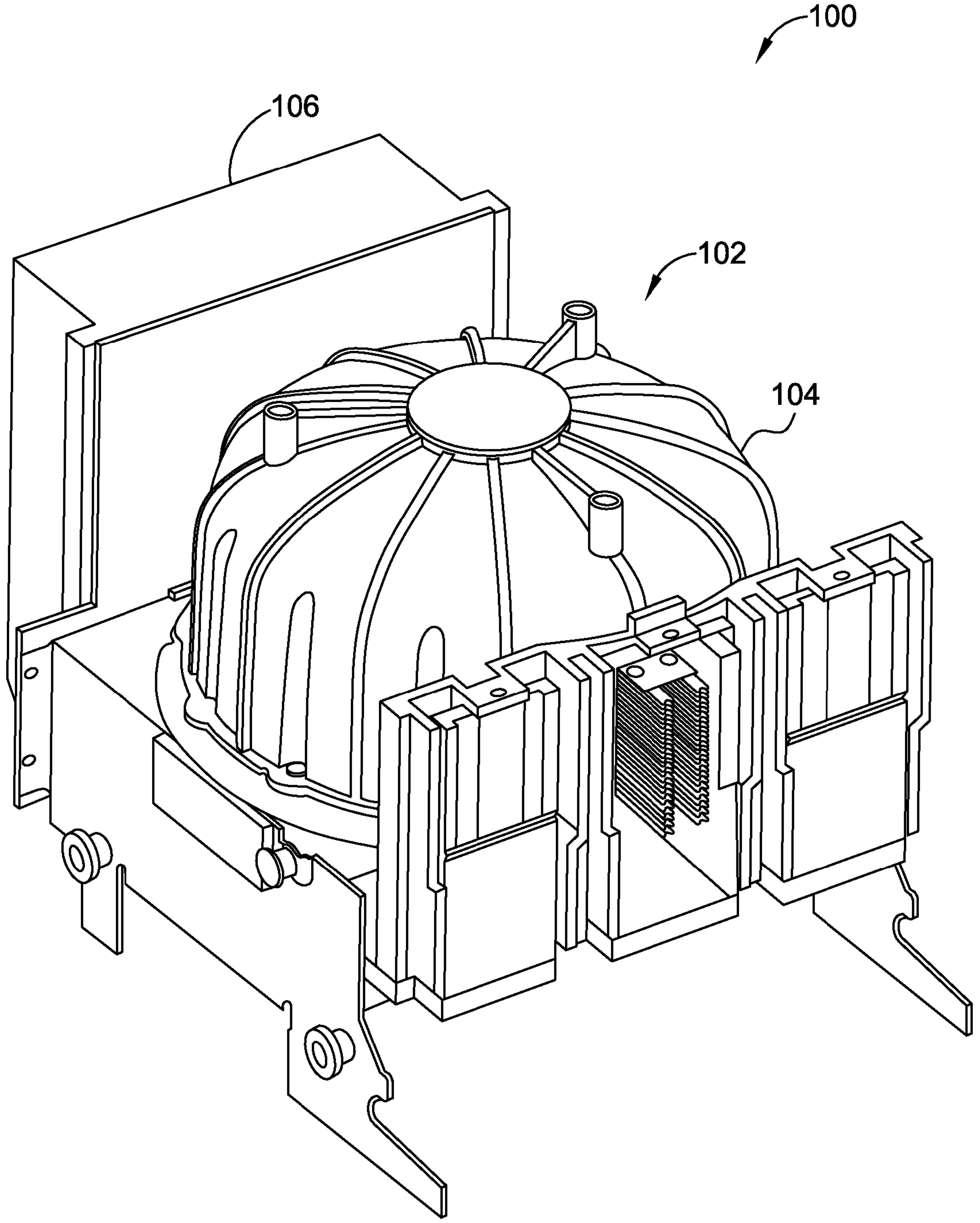
FIG. 1 is a perspective view of an exemplary circuit protection device.

FIG. 1 is a perspective view of an exemplary circuit protection device 100 for use in protection of a circuit (not shown) that includes a plurality of conductors (not shown). More specifically, circuit protection device 100 may be used for protection of power distribution equipment (not shown). In the exemplary embodiment of FIG. 1, circuit protection device 100 includes a containment section 102 having an outer shell 104, and a controller 106 that is coupled to containment section 102. The term "controller," as used herein, refers generally to any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term "controller."

During operation, controller 106 receives signals from one or more sensors (not shown) for use in detecting an arc flash within an equipment enclosure (not shown). The sensor signals may correspond with current measurements through one or more conductors of the circuit, voltage measurements across conductors of the circuit, light measurements in one or more areas of the equipment enclosure, circuit breaker settings or statuses, sensitivity settings, and/or any other suitable sensor signal that indicates an operation status or operating data relating to the power distribution equipment. Controller 106 determines whether an arc flash is occurring or is about to occur based on the sensor signals. If an arc flash is occurring or is about to occur, controller 106 initiates a contained arc flash within containment section 102 and transmits a signal to, for example, a circuit breaker, that is electrically coupled to the circuit at risk of the arc flash. In response to the signal, a plasma gun (not shown) emits an ablative plasma between a plurality of electrodes (not shown in FIG. 1) to facilitate creation of the contained arc. The contained arc enables the excess energy to be removed from the circuit to protect the circuit and any power distribution equipment.

Figure 2:
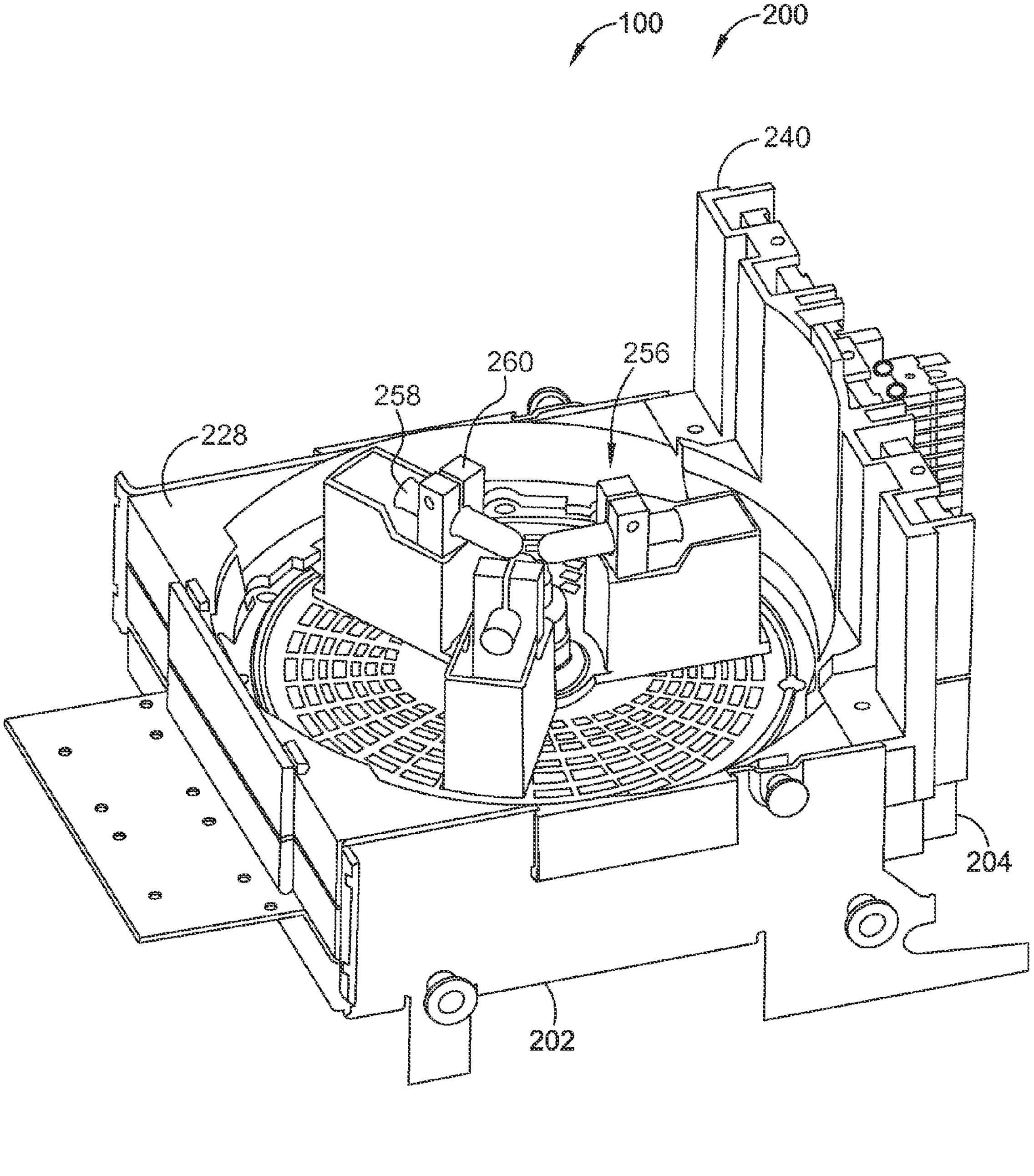
FIG. 2 is a perspective view of an electrical isolation structure that may be used with the circuit protection device shown in FIG. 1.
Figure 3:
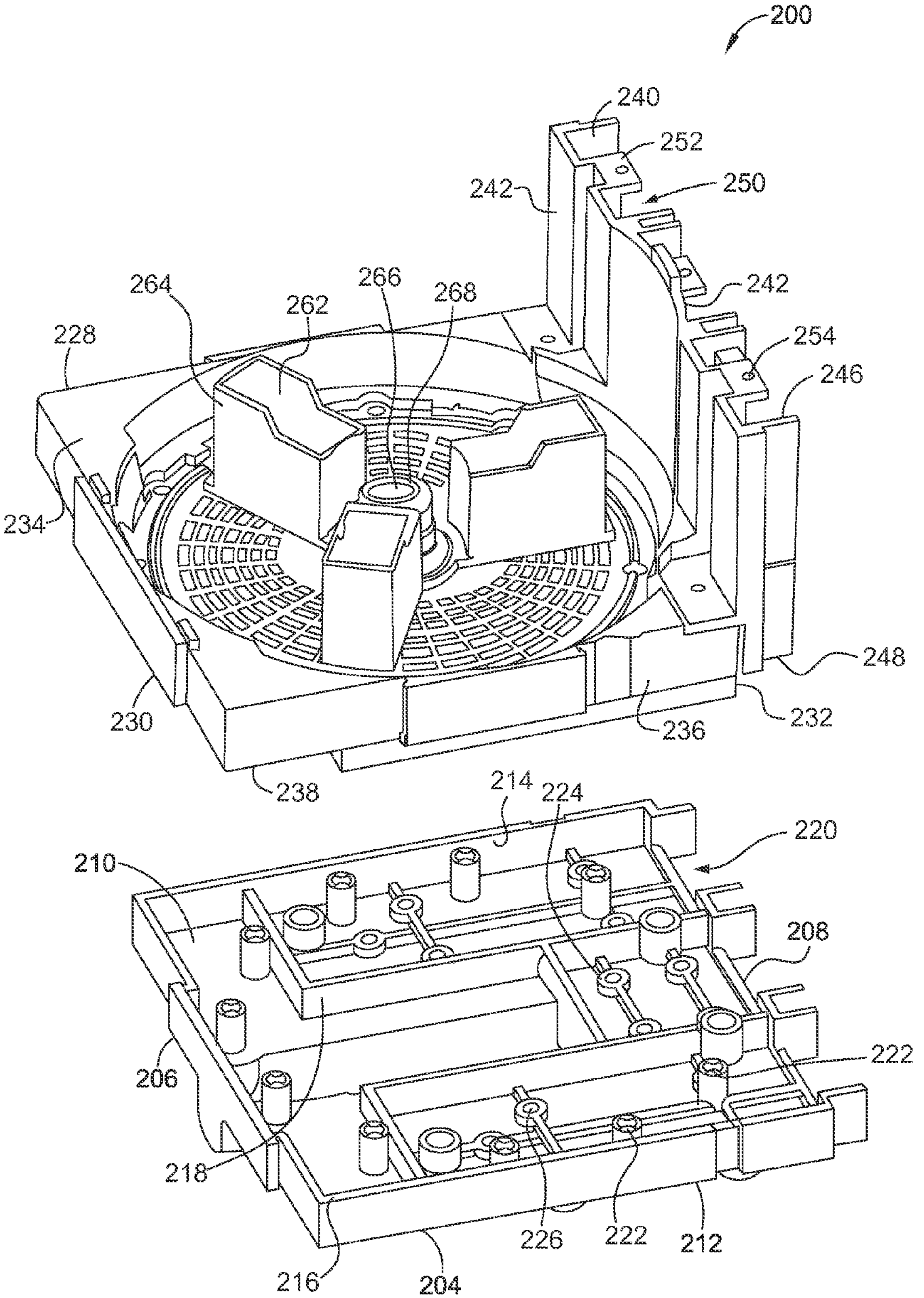
FIG. 3 is a partially exploded view of the electrical isolation structure shown in FIG. 2.

FIG. 2 is a perspective view of an electrical isolation structure 200 of circuit protection device 100, and FIG. 3 is a partially exploded view of electrical isolation structure 200. In the exemplary embodiment, electrical isolation structure 200 includes a base plate 202 that enables circuit protection device 100 to be inserted into an equipment enclosure (not shown) of power distribution equipment (not shown). Moreover, electrical isolation structure 200 includes a conductor base 204 coupled to base plate 202. Conductor base 204 includes a first end 206 and an opposite second end 208. Conductor base 204 also includes a top surface 210 and a bottom surface 212 positioned against base plate 202. A sidewall 214 extends between top surface 210 and bottom surface 212 and includes a top surface 216. Moreover, an interior wall 218 defines a plurality of electrical isolation areas 220 each sized to enable a phase strap (not shown in FIGS. 2 and 3) to be positioned therein and to provide electrical isolation between the phase strap and base plate 202. Each isolation area 220 includes one or more hollow posts 222 sized to receive a coupling mechanism, such as a screw or bolt, therethrough. Moreover, each isolation area 220 includes one or more mounting posts 224 for securing the phase straps to conductor base 204. A mounting aperture 226 extends through each mounting post 224 and is sized to receive a coupling mechanism, such as a screw or bolt, therethrough.

Electrical isolation structure 200 also includes a conductor cover 228 coupled to conductor base 204. Specifically, conductor cover 228 includes a first end 230, an opposite second end 232, a top surface 234, and a sidewall 236 having a bottom surface 238. Conductor cover 228 is coupled to conductor base 204 via a plurality of coupling mechanisms, such as screws or bolts (not shown), that each extends through a respective hollow post 222 and is secured in conductor cover 228. When conductor cover 228 is coupled to conductor base 204, bottom surface 238 is substantially flush with top surface 216. In addition, electrical isolation structure 200 includes a vertical barrier 240 coupled to conductor base 204 and conductor cover 228. Specifically, vertical barrier 240 includes a front surface 242 and an opposite rear surface 244, as well as a top surface 246 and an opposite bottom surface 248. Vertical barrier 240 is coupled to conductor base 204 and conductor cover 228 such that a portion of vertical barrier front surface 242 is positioned in contact with conductor base second end 208 and conductor cover second end 232. Vertical barrier 228 also includes a plurality of recesses 250 that are formed in rear surface 244. Each recess 250 is sized to enable a vertical riser (not shown in FIGS. 2 and 3) to be positioned therein and to provide electrical isolation between the vertical risers. Each recess 250 includes a tongue 252 with an aperture 254 extending therethrough. Apertures 254 are sized to receive a coupling mechanism therethrough to secure a vertical riser within its respective recess 250.

In the exemplary embodiment, circuit protection device 100 also includes a plurality of electrode assemblies 256 that each includes an electrode 258 and an electrode holder 260. Conductor cover 228 includes a plurality of isolation channels 262 that are each sized to house a respective electrode assembly 256 to provide electrical isolation between electrode assemblies 256. Each isolation channel 262 is defined by a plurality of sidewalls 264. Specifically, isolation channels 262 provide electrical isolation between electrode holders 260. Moreover, isolation channels 262 provide electrical isolation between electrodes 258 and the phase straps that are positioned between conductor cover 228 and conductor base 204. Furthermore, conductor cover 228 includes a plasma gun aperture 266 that is defined by a circular sidewall 268. Plasma gun aperture 266 is sized to enable a plasma gun (not shown) to extend at least partially therethrough. When activated, the plasma gun emits an ablative plasma that enables arc formation between electrodes 258.

Figure 4:
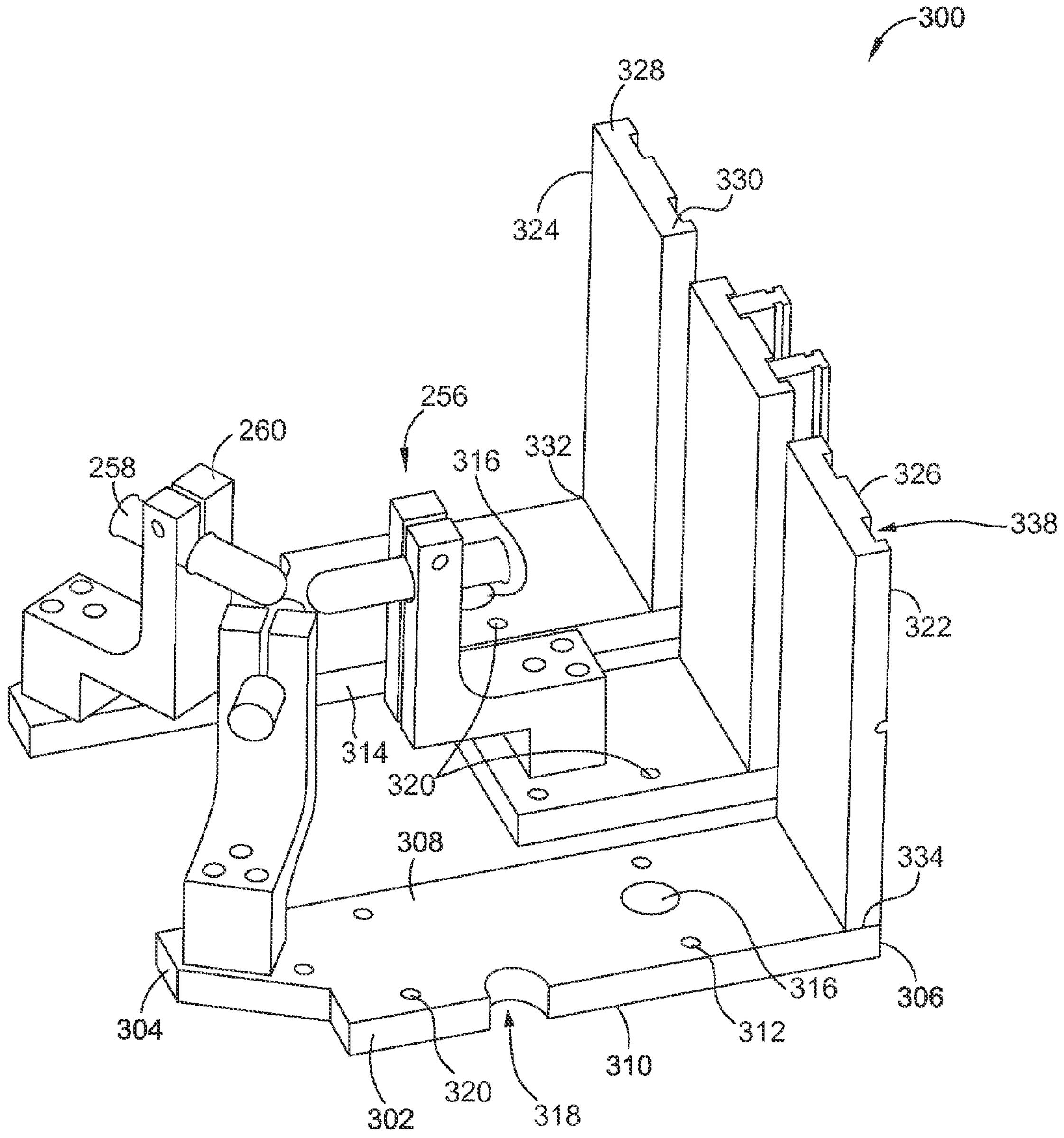
FIG. 4 is a perspective view of a phase electrode assembly that may be used with the circuit protection device shown in FIG. 1.
Figure 5:
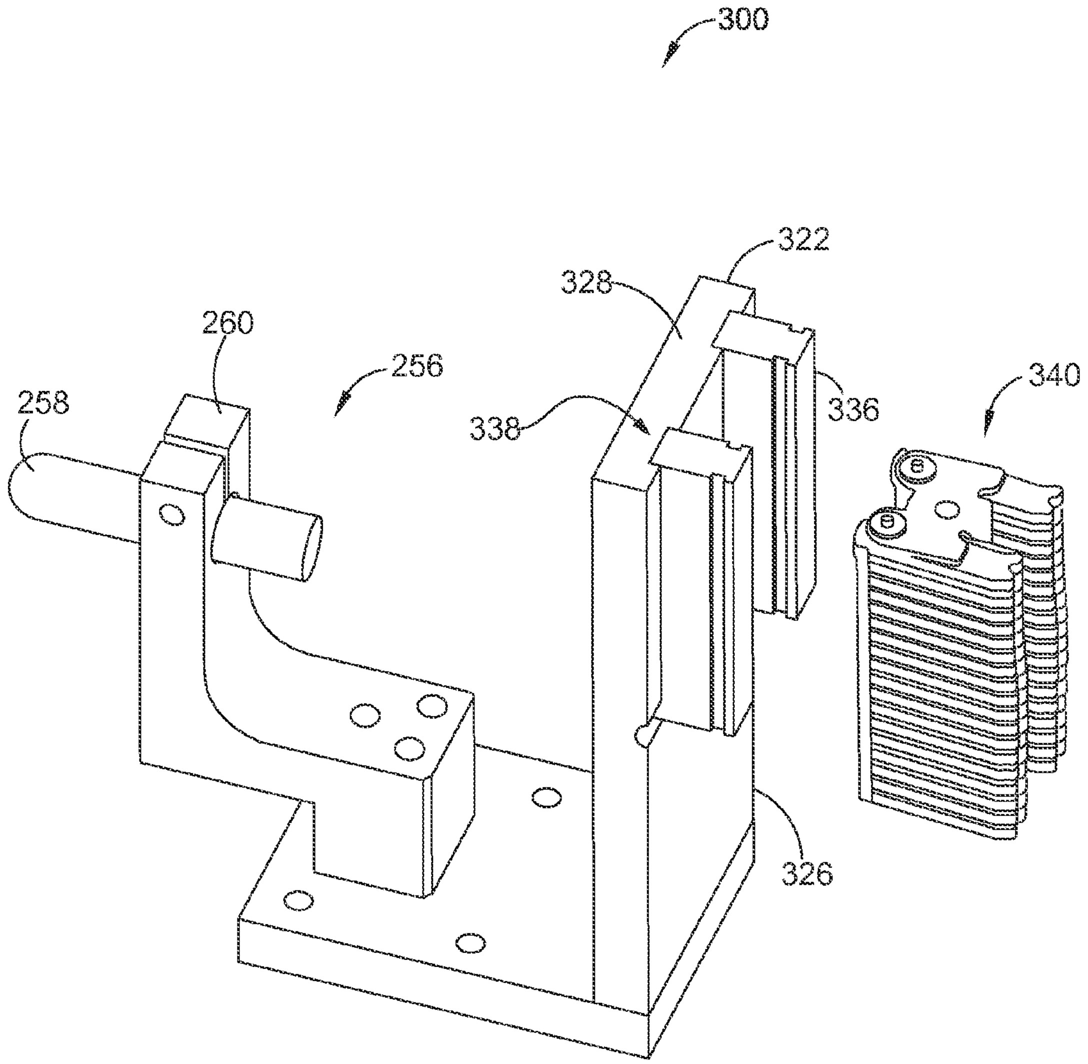
FIG. 5 is an alternate perspective view of the phase electrode assembly shown in FIG. 4.

FIG. 4 is a perspective view of a phase electrode assembly 300 that may be used with circuit protection device 100 (shown in FIG. 1), and FIG. 5 is an alternate perspective view of phase electrode assembly 300. In the exemplary embodiment, phase electrode assembly 300 includes a plurality of electrode assemblies 256. Phase electrode assembly 300 also includes a plurality of phase straps 302. In the exemplary embodiment, each phase strap 302 comprises an electrically conductive material, such as copper. However, any suitably conductive material may be used. Moreover, each phase strap 302 includes a first end 304, an opposite second end 306, a top surface 308, an opposite bottom surface 310, and a plurality of side surfaces including a first side surface 312 and a second side surface 314. Side surfaces 312 and 314 and first end 304 are positioned in contact with or adjacent to interior wall 218 (shown in FIG. 3) of conductor base 204 (shown in FIG. 3) such that interior wall 218 provides electrical isolation between phase straps 302. Phase strap 302 also includes a means for coupling to conductor base 204. For example, one or more phase straps 302 include a hollow post aperture 316 that extends between top surface 308 and bottom surface 310. Hollow post aperture 316 is sized to receive hollow post 222 (shown in FIG. 3) therethrough when conductor cover 228 is coupled to conductor base 204 with phase straps 302 positioned therebetween. Moreover one or more phase straps 302 include a recess 318 that is sized to be positioned against hollow post 222 when conductor cover 228 is coupled to conductor base 204 with phase straps 302 positioned therebetween. Furthermore, one or more phase straps 302 include one or more apertures 320 that are sized to receive a coupling mechanism therethrough to secure phase strap 302 within a respective isolation area 220 of conductor base 204. Each electrode assembly 256 is coupled to a respective phase strap 302 such that electrode holder 260 is positioned substantially flush with phase strap top surface 308 at phase strap first end 304 to facilitate transfer of electrical energy from phase strap 302 to electrode assembly 256. In the exemplary embodiment, conductor base 204 (shown in FIGS. 2 and 3) provides electrical isolation between phase straps 302 and base plate 202 (shown in FIG. 2).

Each phase strap 302 is coupled to a vertical riser 322. In the exemplary embodiment, each vertical riser 322 is composed of an electrically conductive material, such as copper. However, any suitably conductive material may be used. Moreover, each vertical riser 322 includes a front surface 324, an opposite rear surface 326, a top end 328 having a top surface 330, and an opposite bottom end 332 having a bottom surface 334. Vertical riser 322 is coupled to phase strap 302 such that vertical riser bottom surface 334 is positioned substantially flush with phase strap top surface 308 at phase strap second end 306 to facilitate transfer of electrical energy from vertical riser 322 to phase strap 302. In the exemplary embodiment, vertical risers 322 facilitate racking circuit protection device 100 into a bus (not shown) while powered and/or unracking circuit protection device 100 from the bus while powered. In an alternative embodiment, phase electrode assembly 300 does not include vertical risers 322. In such an embodiment, each phase strap 302 is coupled, such as coupled directly in contact with, a bus.

Moreover, as shown in FIG. 5, a cluster support 336 is coupled to rear surface 326 of each vertical riser 322. Specifically, cluster support 336 is coupled to vertical riser 322 within a respective recess 338 that is formed in rear surface 326. In the exemplary embodiment, each cluster support 336 is composed of an electrically conductive material, such as copper. However, any suitably conductive material may be used. Moreover, a connector, such as a spring cluster 340, is coupled, such as removably coupled, to each cluster support 336. Spring cluster 340 provides an electrical connection between conductors of a circuit (neither shown). For example, a phase conductor may be coupled to a first spring cluster to provide electrical energy to a first electrode, a ground conductor may be coupled to a second spring cluster to provide a ground point at a second electrode, and a neutral conductor may be coupled to a third spring cluster. It should be understood that multiple phase conductors may be coupled to respective spring clusters to provide electrical energy at different phases to different electrodes.

Phase electrode assembly 300 enables electrical energy to be transferred from a conductor to a respective electrode 258 via a current path. In the exemplary embodiment, the current path includes spring cluster 340, cluster support 336, vertical riser 322, phase strap 302, electrode holder 260, and electrode 258. In an alternative embodiment, phase electrode assembly 300 does not include vertical riser 322, cluster support 336, and/or spring cluster 340. In such an embodiment, the current path includes phase strap 302, electrode holder 260, and electrode 258.

Figure 6:
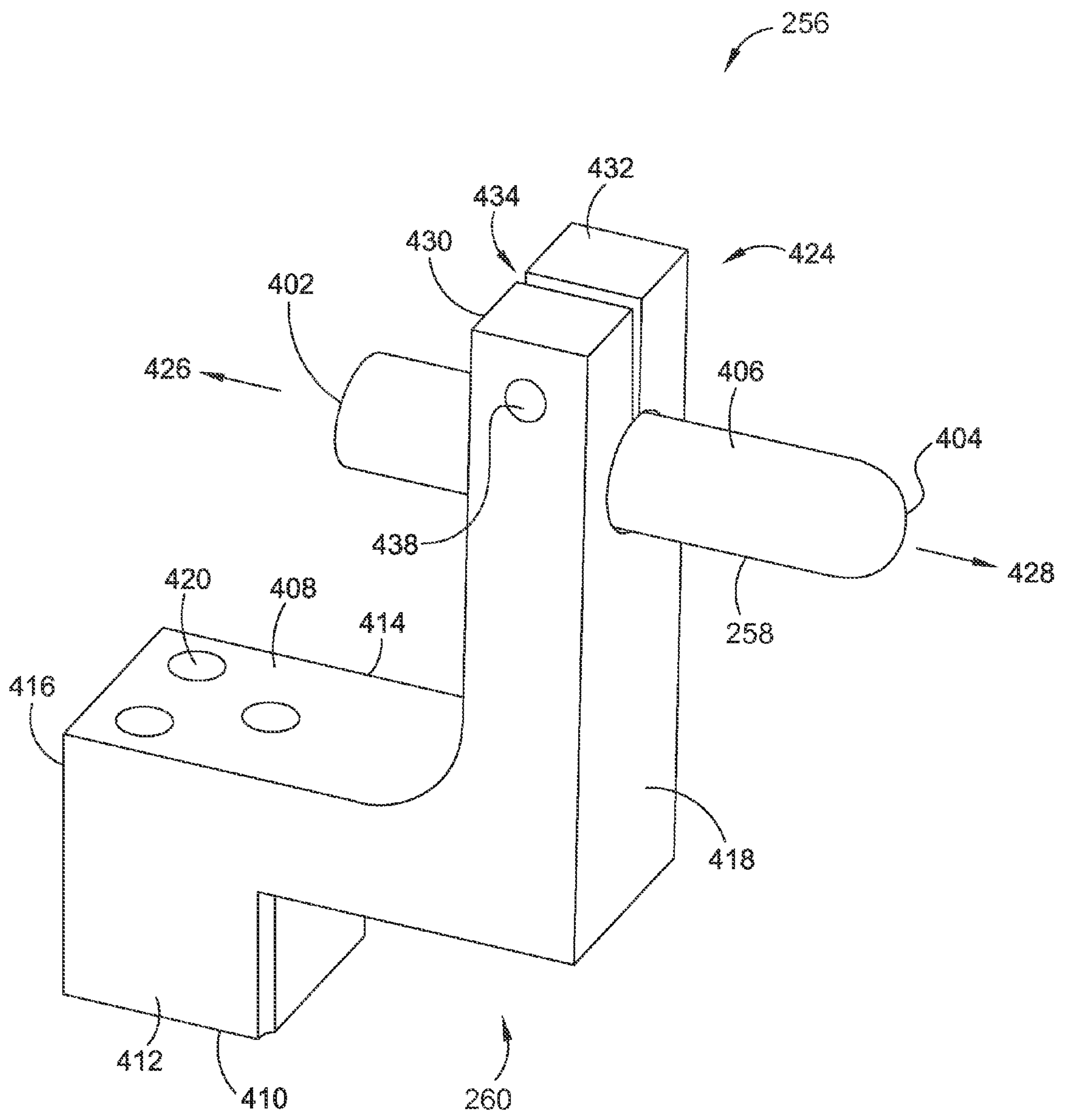
FIG. 6 is a view of an exemplary electrode assembly that may be used with the phase electrode assembly shown in FIGS. 4 and 5.

FIG. 6 is a view of an exemplary adjustable electrode assembly 256 that may be used with phase electrode assembly 300 (shown in FIGS. 4 and 5). In the exemplary embodiment, electrode assembly 256 includes an electrode 258 that has an elongate shape. Moreover, electrode 258 has a first end 402 and an opposite second end 404 that define an electrode length therebetween. Second end 404 is substantially spherically shaped. Electrode 258 has a first circumference about an outer surface 406, such that the first circumference is substantially the same for the entire electrode length. In the exemplary embodiment, electrode 258 is composed of a consumable material such as an alloy of tungsten and steel. However, electrode 258 may alternatively be composed of any single material or any alloy of multiple materials that enables electrode 258 to be used to ignite an arc flash within a gap between electrodes 258. Moreover, electrode 258 may alternatively be composed of a non-consumable material that enables electrode 258 to be re-used to ignite an arc flash within a gap between electrodes 258.

In the exemplary embodiment, electrode assembly 256 also includes an electrode holder 260 that is composed of an electrically conductive material, such as copper. However, electrode holder 260 may be composed of any other conductive material that also prevents thermal issues between two dissimilar materials, such as between electrode 258 and electrode holder 260. Electrode holder 260 includes a top surface 408 and an opposite bottom surface 410. Electrode holder 260 also has a plurality of side surfaces, including a first side surface 412, an opposite second side surface 414, a first end surface 416, and an opposite second end surface 418. A plurality of mounting apertures 420 are defined through electrode holder 260 from top surface 408 through bottom surface 410. A coupling mechanism, such as a screw or bolt (not shown), that is sized to be inserted through a corresponding mounting aperture 420 is used to mount electrode holder 260 to phase strap top surface 308 (shown in FIG. 4). Specifically, electrode holder 260 is coupled to phase strap 302 (shown in FIG. 4) such that electrode holder bottom surface 410 is positioned substantially flush with phase strap top surface 308 at phase strap second end 306 (shown in FIG. 4) to facilitate transfer of electrical energy from phase strap 302 to electrode holder 238.

Moreover, electrode holder 260 includes a clamp portion 424 that secures electrode 258. More specifically, clamp portion 424 enables a position of electrode 258 to be adjusted in a first direction 426 to create a smaller electrode gap between electrodes 258 as shown in FIG. 4, for example. Clamp portion 424 also enables the position of electrode 258 to be adjusted in a second direction 428 to create a larger electrode gap between electrodes 258. Furthermore, clamp portion 424 enables electrode 258 to be removed from electrode assembly 234 to be repaired and/or replaced. In the exemplary embodiment, clamp portion 424 includes a first portion 430 and a second portion 432 that are separated by a gap 434. Clamp portion 424 also includes an opening 436 that is sized to receive electrode 258. Opening 436 includes a second circumference that is slightly larger than the first circumference of electrode 258 to enable the position of electrode 258 to be adjusted and/or to enable electrode 258 to be removed from electrode assembly 256. Clamp portion 424 also includes a clamping mechanism 438 that secures electrode 258 within opening 426. Specifically, clamping mechanism 438 secures electrode 258 such that electrode outer surface 406 is substantially flush with an inner surface (not shown) of opening

436 to facilitate transfer of electrical energy from electrode holder 260 to electrode 258. In the exemplary embodiment, clamping mechanism 438 is a screw or bolt (not shown) that extends through first portion 430 into second portion 432. As the screw or bolt is tightened, first portion 430 is forced closer to second portion 432 such that gap 434 becomes smaller and the second circumference of opening 436 becomes smaller, thereby securing electrode 258 within opening 436. In an alternative embodiment, clamping mechanism 438 is a set screw (not shown) that extends through clamp portion 424, such as through first portion 430, and into opening 436. In such an embodiment, the set screw is tightened directly against electrode outer surface 406 to secure electrode 258 within opening 436. In some embodiments, electrode 258 is fixed secured within opening 436, such as welded in a specific position within opening 436. In one such embodiment, electrode holder 260 may then be adjusted to position electrode 258 in a desired position with respect to other electrodes 258 and with respect to plasma gun aperture 266 (shown in FIG. 3).

Exemplary embodiments of apparatus for use in devices for protection of power distribution equipment are described above in detail. The apparatus are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

Although the present invention is described in connection with an exemplary power distribution environment, embodiments of the invention are operational with numerous other general purpose or special purpose power distribution environments or configurations. The power distribution environment is not intended to suggest any limitation as to the scope of use or functionality of any aspect of the invention. Moreover, the power distribution environment should not be interpreted as having any dependency or requirement relating to any one or combination of components illustrated in the exemplary operating environment.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A circuit protection device for use with a circuit that includes at least one conductor, said circuit protection device comprising:

at least one phase electrode assembly electrically coupled to the at least one conductor, said at least one phase electrode assembly comprising an adjustable electrode assembly;

a conductor base comprising at least one isolation area sized to secure said adjustable electrode assembly therein, a sidewall and an interior wall, said sidewall and said interior wall disposed to define each of said plurality of isolation areas, and said interior wall configured to provide electrical isolation between a plurality of the phase straps of the plurality of phase electrode assemblies; and a conductor cover coupled to said conductor base and comprising at least one isolation channel, wherein said adjustable electrode assembly extends at least partially through said at least one isolation channel.

2. A circuit protection device in accordance with claim 1, wherein said adjustable electrode assembly comprises:

an electrode; and an electrode holder comprising a clamp portion that defines an opening sized to receive said electrode such that a position of said electrode within said opening is adjustable in a first direction and an opposite second direction.

3. A circuit protection device in accordance with claim 2, wherein said clamp portion comprises a clamping mechanism configured to secure said electrode within said opening.

4. A circuit protection device in accordance with claim 2, wherein said electrode comprises a first surface and said opening comprises an opposing second surface, said clamp portion configured to secure said electrode within said opening to facilitate transfer of electrical energy from said second surface to said first surface.

5. A circuit protection device in accordance with claim 2, wherein said at least one phase electrode assembly further comprises a phase strap coupled to said electrode holder to conduct current to said electrode from the at least one conductor.

6. A circuit protection device in accordance with claim 5, wherein said at least one phase electrode assembly further comprises a connector coupled to the at least one conductor to conduct current to said phase strap from the at least one conductor.

7. A circuit protection device in accordance with claim 6, wherein a current-carrying path is defined by said connector, said phase strap, and said electrode holder to facilitate transferring electrical energy from the at least one conductor to said electrode.

8. A circuit protection device in accordance with claim 5, further comprising a base plate, wherein said conductor base provides electrical isolation between said phase strap and said base plate.

9. A circuit protection device in accordance with claim 5, wherein:

said at least one phase electrode assembly comprises a plurality of phase electrode assemblies;

said conductor base comprises a plurality of isolation areas each sized to receive a respective phase strap of said plurality of phase electrode assemblies; and said conductor cover comprises a plurality of isolation channels each sized to house a respective phase electrode assembly of said plurality of phase electrode assemblies.

10. A circuit protection device in accordance with claim 1, wherein said circuit protection device is configured to generate an arc, said circuit protection device further comprising a containment section coupled to said conductor cover, said containment section comprising an outer shell configured to contain electrical energy produced by the arc.

11. An electrical isolation structure for use with a circuit protection device that includes a plurality of phase electrode assemblies each having an electrode movably coupled to an electrode holder, and a phase strap, said support structure comprising:

a conductor base comprising a plurality of isolation areas sized to secure a respective phase strap therein, a sidewall and an interior wall, said sidewall and said interior wall disposed to define each of said plurality of isolation areas, and said interior wall configured to provide electrical isolation between a plurality of the phase straps of the plurality of phase electrode assemblies, said conductor base is configured to provide electrical isolation between the phase straps of the plurality of phase electrode assemblies; and a conductor cover coupled to said conductor base and comprising a plurality of isolation channels, wherein a respective electrode holder extends at least partially through a respective isolation channel of said plurality of isolation channels to provide electrical isolation between a plurality of the electrode holders of the plurality of phase electrode assemblies.

12. An electrical isolation structure in accordance with claim 11, wherein each of the plurality of phase electrode assemblies includes a riser coupled to the phase strap, said electrical isolation structure further comprising a barrier coupled to said conductor cover, said barrier comprising a plurality of recesses each sized to receive a respective riser of the plurality of phase electrode assemblies and to provide electrical isolation between a plurality of the risers of the plurality of phase electrode assemblies.

13. An electrical isolation structure in accordance with claim 11, further comprising a base plate coupled to said conductor base, wherein said conductor base further provides electrical isolation between said base plate and the plurality of phase electrode assemblies.

14. An electrical isolation structure in accordance with claim 11, wherein said conductor cover further comprises a plasma gun aperture sized to enable a plasma gun to emit a plasma plume therethrough.

15. A method of assembling a circuit protection device for use with a circuit that includes at least one conductor, wherein the circuit protection device includes a conductor base having at least one isolation area, a conductor cover having at least one isolation channel, at least one electrode post assembly having an electrode holder and an electrode that is secured within an opening defined in the electrode holder, a base plate and the conductor base further includes an interior wall, and a sidewall that define the at least one isolation area, said securing the at least one electrode post assembly within the at least one isolation area comprises positioning the phase strap adjacent at least one of the sidewall and the interior wall to electrically isolate the phase strap from the base plate, said method comprising:

inserting the electrode into the opening;

securing the electrode within the opening;

securing the at least one electrode post assembly within the at least one isolation area;

coupling the conductor cover to the conductor base such that the at least one electrode post assembly extends at least partially through the at least one isolation channel; and electrically coupling the at least one electrode post assembly to the at least one conductor.

16. A method in accordance with claim 15, wherein the clamp portion includes a clamping mechanism, a first portion, and an opposite second portion separated from the first portion by a clamping mechanism to exert a force on at least one of the first portion and the second portion to secure the electrode within the opening.

17. A method in accordance with claim 15, further comprising:

coupling a phase strap to the electrode holder;

coupling a connector to the at least one conductor, wherein a current-carrying path is defined by the connector, the phase strap, and the electrode holder to facilitate transferring electrical energy from the at least one conductor to the electrode.

18. A method in accordance with claim 15, further comprising adjusting a position of the electrode within the opening in one of a first direction and an opposite second direction.

* * * * *